United States Patent
D'Abreu et al.

(10) Patent No.: US 9,817,749 B2
(45) Date of Patent: Nov. 14, 2017

(54) APPARATUS AND METHOD OF OFFLOADING PROCESSING FROM A DATA STORAGE DEVICE TO A HOST DEVICE

(71) Applicant: SanDisk Technologies LLC, Plano, TX (US)

(72) Inventors: Manuel Antonio D'Abreu, El Dorado Hills, CA (US); Dimitris C. Pantelakis, Santa Clara, CA (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 114 days.

(21) Appl. No.: 14/096,979

(22) Filed: Dec. 4, 2013

(65) Prior Publication Data
US 2015/0154111 A1 Jun. 4, 2015

(51) Int. Cl.
*G06F 11/00* (2006.01)
*G06F 12/02* (2006.01)
*G06F 12/14* (2006.01)

(52) U.S. Cl.
CPC ...... *G06F 12/0246* (2013.01); *G06F 12/1408* (2013.01); *G06F 2212/1056* (2013.01); *G06F 2212/7211* (2013.01)

(58) Field of Classification Search
CPC .. G06F 11/1068; G06F 11/1048; G06F 11/10; G06F 11/1012; G06F 11/1008; G06F 11/1072; G06F 12/0246; G06F 11/1044; G06F 3/0619; G06F 11/106; G06F 2212/7202; G06F 3/0679; G06F 11/1004; G06F 2212/7211; G06F 2212/214; G06F 2212/7206; G06F 3/0659; G06F 3/0688; G06F 2212/1056; G06F 12/1408; G06F 11/01

See application file for complete search history.

(56) References Cited

U.S. PATENT DOCUMENTS

| | | | |
|---|---|---|---|
| 7,080,306 B1 * | 7/2006 | Sugawara et al. | 714/755 |
| 7,389,466 B1 * | 6/2008 | Harmer et al. | 714/763 |
| 8,261,136 B2 | 9/2012 | d'Abreu et al. | |
| 8,341,498 B2 | 12/2012 | d'Abreu et al. | |
| 8,392,807 B2 | 3/2013 | Naradasi et al. | |
| 8,874,824 B2 * | 10/2014 | Luukkainen | G06F 12/0223 711/103 |
| 2001/0018741 A1 * | 8/2001 | Hogan | G06F 21/00 713/189 |
| 2007/0245215 A1 * | 10/2007 | Hwang et al. | 714/758 |
| 2008/0189588 A1 * | 8/2008 | Tanaka et al. | 714/764 |

(Continued)

OTHER PUBLICATIONS

Desireddi, Sateesh et al. "Systems and Methods of Updating Read Voltages," U.S. Appl. No. 13/523,680, filed Jun. 14, 2012, 31 pages.

(Continued)

*Primary Examiner* — Jason Bryan
(74) *Attorney, Agent, or Firm* — Patterson & Sheridan, LLP

(57) ABSTRACT

A storage device includes non-volatile memory and a controller. A method performed in the data storage device includes sending an instruction to a host device to cause the host device to perform one or more specified computations. The method further includes receiving a response from the host device. The response is based on execution of the one or more specified computations.

23 Claims, 3 Drawing Sheets

(56) References Cited

U.S. PATENT DOCUMENTS

| | | | |
|---|---|---|---|
| 2010/0125772 A1* | 5/2010 | Cheng et al. | 714/758 |
| 2010/0250836 A1* | 9/2010 | Sokolov | G06F 12/0246 |
| | | | 711/103 |
| 2011/0099438 A1 | 4/2011 | Gonzalez et al. | |
| 2011/0296088 A1* | 12/2011 | Duzly | G06F 12/0246 |
| | | | 711/103 |
| 2013/0124781 A1 | 5/2013 | Sadashivappa | |
| 2013/0139030 A1* | 5/2013 | Okubo et al. | 714/755 |
| 2013/0159766 A1 | 6/2013 | d'Abreu et al. | |
| 2013/0227374 A1 | 8/2013 | Desireddi | |
| 2013/0238955 A1 | 9/2013 | d'Abreu et al. | |
| 2015/0019904 A1* | 1/2015 | Cho | G06F 11/1012 |
| | | | 714/6.11 |

OTHER PUBLICATIONS

D'Abreu, Manuel Antonio et al. "Tracking Read Accesses to Regions of Non-Volatile Memory," U.S. Appl. No. 13/756,946, filed Feb. 1, 2013, 25 pages.

Desireddi, Sateesh et al. "Systems and Methods to Update Reference Voltages in Response to Data Retention in Non-Volatile Memory," U.S. Appl. No. 13/771,894, filed Feb. 20, 2013, 29 pages.

\* cited by examiner

US 9,817,749 B2

APPARATUS AND METHOD OF OFFLOADING PROCESSING FROM A DATA STORAGE DEVICE TO A HOST DEVICE

FIELD OF THE DISCLOSURE

The present disclosure is generally related to offloading processing from a data storage device to a host device.

BACKGROUND

Non-volatile data storage devices, such as universal serial bus (USB) flash memory devices, embedded flash memory devices, or removable storage cards, have allowed for increased portability of data and software applications. Flash memory devices can enhance data storage density by storing multiple bits in each flash memory cell. For example, Multi-Level Cell (MLC) flash memory devices provide increased storage density by storing 2 bits per storage element, 3 bits per storage element, or more. Although increasing the number of bits per storage element and reducing device feature dimensions may increase a storage density of a memory device, complexity, size, and cost of a controller of the flash memory device may all increase. For example, a controller may be designed and configured to perform a plurality of tasks associated with operating, managing, and controlling a flash memory device.

SUMMARY

Processing burden experienced by a controller of a data storage device may be alleviated by offloading processing typically performed by the controller of the data storage device. For example, processing may be offloaded to a host device coupled to the data storage device. The host device may include a driver that defines a plurality of computations (e.g., operations or functions) that are typically performed at the data storage device. The data storage device may send an instruction to the host device that causes the host device to perform one or more computations of the plurality of computations based on the instruction. The instruction may include an identifier (e.g., an op-code, an index value, or a procedure call) that identifies the one or more computations. The data storage device may receive a response from the host device as a result of execution of the one or more computations by the host device. By instructing the host device to perform the one or more operations, the data storage device is alleviated from a burden of performing the one or more computations. Alleviating the burden of performing the one or more computations may result in the data storage device being able to perform one or more other operations, such as read operations or write operations, while the host device executes the one or more computations on behalf of the data storage device.

DETAILED DESCRIPTION

Figure 1:
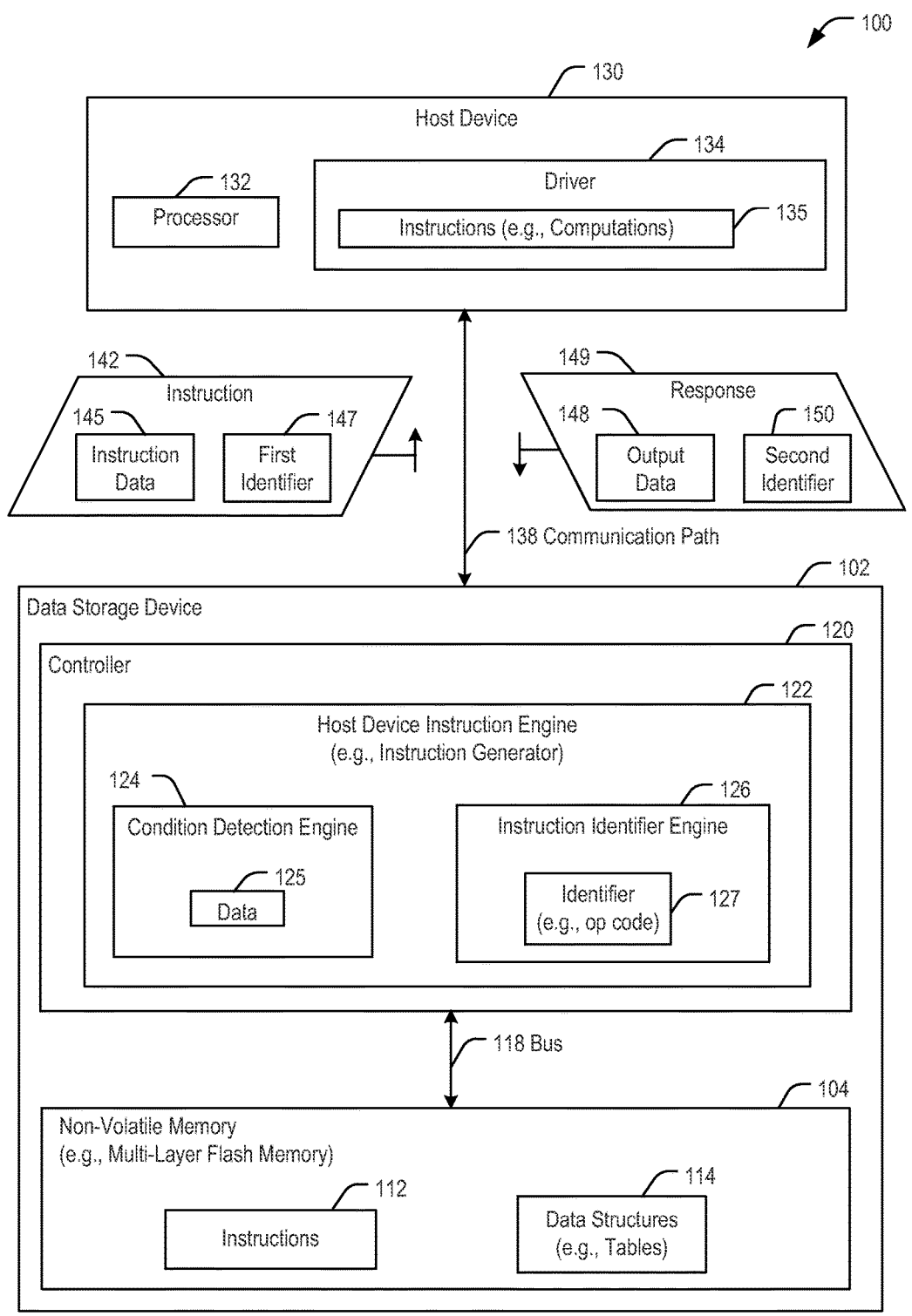
FIG. 1 is a block diagram of a particular illustrative embodiment of a system including a data storage device including a controller configured to instruct a host device to perform one or more computations.

Referring to FIG. 1, a system 100 includes a data storage device 102 coupled to a host device 130. For example, the data storage device 102 may be coupled to the host device 130 via a communication path 138, such as a wired communication path and/or a wireless communication path. In a particular embodiment, the data storage device 102 may be attached or embedded within one or more host devices, such as within a housing of a host communication device. However, in other embodiments, the data storage device 102 may be implemented in a portable device configured to be selectively coupled to one or more external devices.

The host device 130 may include a processor 132 and a driver 134, as described further herein. The host device 130 may include a mobile telephone, a music player, a video player, a gaming console, an electronic book reader, a personal digital assistant (PDA), a computer, such as a laptop computer, a notebook computer, or a tablet computer, any other electronic device, or any combination thereof.

The host device 130 may be configured to implement a communication protocol via a memory interface that enables reading from and/or writing to a memory, such as a non-volatile memory 104 of the data storage device 102. For example, the host device 130 may operate in compliance with a Joint Electron Devices Engineering Council (JEDEC) industry specification. As other examples, the host device 130 may operate in compliance with one or more other specifications.

The data storage device 102 may be configured to be coupled to the host device 130. The data storage device 102 may be a memory card, such as a Secure Digital SD® card, a microSD® card, a miniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). As another example, the data storage device 102 may be configured to be coupled to the host device 130 as a solid state drive (SSD). As another example, the data storage device 102 may be configured to be coupled to the host device 130 as embedded memory, such as eMMC® (trademark of JEDEC Solid State Technology Association, Arlington, Va.) and eSD, as illustrative examples. To illustrate, the data storage device 102 may correspond to an eMMC (embedded MultiMedia Card) device. The data storage device 102 may operate in compliance with a JEDEC industry specification. For example, the data storage device 102 may operate in compliance with a JEDEC eMMC specification, a JEDEC Universal Flash Storage (UFS) specification, one or more other specifications, or a combination thereof.

The data storage device 102 includes a controller 120 and the non-volatile memory 104. The controller 120 may be coupled to the non-volatile memory 104 via a bus 118. The non-volatile memory 104 may include a flash memory, such as a NAND flash memory, a NOR flash memory, or any other type of flash memory. The non-volatile memory 104 may include another type of non-volatile memory, such as a resistive random-access memory (ReRAM). The non-volatile memory 104 may include one or more dies. The one or more dies may be configured in a stacked configuration (e.g., a stacked architecture). For example, the non-volatile memory 104 may include a multi-layer flash memory, such as a stacked flash memory or a three dimensional flash memory. Each of the one or more dies may include multiple blocks that each has a plurality of word lines. Each word line of the plurality of word lines may include multiple storage elements (e.g., multiple memory cells).

The non-volatile memory 104 may include instructions 112 and one or more data structures 114. The instructions 112 may be associated with firmware that is executable by the controller 120. The controller 120 may access the instructions 112 to control and to manage operation of the data storage device 102, such as to control reading data from the non-volatile memory 104 and/or writing data to the non-volatile memory 104. The one or more data structures 114 may be accessible to the controller 120 and may include one or more tables, one or more databases, one or more tree structures, or one or more mappings, as illustrative, non-limiting examples. For example, the one or more data structures 114 may include a condition to identifier mapping and/or an identifier to operation mapping, as described further herein.

The controller 120 may be configured to send data and a write command to instruct the non-volatile memory 104 to store the data to a first specified address of the non-volatile memory 104. Additionally or alternatively, the controller 120 may be configured to send a read command to read data from a second specified address of the non-volatile memory 104. The controller 120 may store and read the data based on one or more access requests (e.g., read access requests and/or write access requests) received from the host device 130. Further, the controller 120 may be configured to generate an instruction 142 and to send the instruction 142 to the host device 130 to cause the host device 130 to perform one or more specified computations, as described further herein.

The controller 120 includes a host device instruction engine 122 that may be configured to detect a condition and to offload processing associated with the detected condition to the host device 130. The host device instruction engine 122 may include a condition detection engine 124 and an instruction identifier engine 126. Although the condition detection engine 124 and the instruction identifier engine 126 are depicted as being included in the host device instruction engine 122, one or more of the condition detection engine 124 and the instruction identifier engine 126 may be distinct from the host device instruction engine 122. The condition detection engine 124, the instruction identifier engine 126, and or the host device instruction engine 122 may be in a processor that executes software, hardware, or a combination thereof.

The condition detection engine 124 may monitor operations of the data storage device 102 and/or detect one or more conditions associated with the operations of the data storage device 102. For example, the one or more conditions may be monitored and/or detected at any time during operation of the data storage device 102, such as any time including and/or between start-up and shut down of the data storage device 102. The one or more conditions may be detected based on a status, a state, a value, or an output (e.g., a signal) of the non-volatile memory 104 or one or more other components of the controller 120, such as a counter, a register, an Error Correction Coding (ECC) engine, an encoder, or a decoder, as illustrative, non-limiting examples. For example, the one or more conditions may be associated with or correspond to an error correction code (ECC) failure, a value of a counter tracking memory accesses, a shift in voltage values at the non-volatile memory 104, a count of read errors, a state of a memory cell and one or more neighboring memory cells, a reliability measurement (e.g., a count of writes, a count of reads, a count of other memory accesses, an error rate, an elapsed time since data was written to a portion of the non-volatile memory 104), a transition characteristic (e.g., a count of state transitions) of data to be stored, or detection of a trend indicating an increase in read errors or read time, as illustrative, non-limiting examples. The condition detection engine 124 may provide an indication of a particular detected condition to the instruction identifier engine 126.

The instruction identifier engine 126 is configured to determine an identifier 127 (e.g., an op-code, an index value, and/or a procedure call) based on a particular condition detected by the condition detection engine 124. The identifier 127 (e.g., an instruction identifier) may be used by the data storage device 102 to instruct the host device 130 to perform one or more computations. The identifier 127 may be stored in a register associated with the instruction identifier engine 126 or in a memory, such as the non-volatile memory 104.

The instruction identifier engine 126 may determine the identifier 127 based on the one or more data structures 114, such as based on a condition to identifier mapping. For example, the condition to identifier mapping may enable the instruction identifier engine 126 to translate a detected condition into a corresponding identifier. The identifier 127 may be associated with one or more computations to be performed based on the particular condition. For example, the one or more computations may be associated with heroics (e.g., data recovery), wear leveling, data scrambling, physical-to-logical address mapping, generating extended parity bits, adjusting a memory refresh rate, interleaving data to be written to a memory, or reference voltage updating, as illustrative, non-limiting examples.

To illustrate, as a first example, the condition detection engine 124 may detect a first condition associated with an ECC failure, such as one or more uncorrectable errors in data read from the non-volatile memory 104. Based on detection of the first condition (e.g., the detected ECC failure), the identifier 127 may be selected that corresponds to one or more computations associated with heroics processing. The heroics processing may perform data recovery on the uncorrected data that generated the ECC failure.

As a second example, the condition detection engine 124 may detect a second condition based on a reliability measurement. For example, the reliability measurement may be compared to a reliability standard (e.g., a threshold) to detect the second condition. The reliability measurement may include a count of write operations, a count of read operations, a count of other memory accesses, a count of a number of errors detected in a block of the non-volatile memory 104, a number of erase operations performed on a block of the non-volatile memory 104, or an elapsed time since data was written to a particular portion of the non-volatile memory 104, as illustrative, non-limiting examples. Based on detection of the second condition, the identifier 127 may be selected (e.g., determined) that corresponds to one or more computations associated with wear leveling. For example, the identifier 127 may correspond to one or more computations to determine whether wear leveling should be performed, to select a wear leveling technique, and/or to apply the selected wear leveling technique, as illustrative, non-limiting examples.

As a third example, the condition detection engine 124 may detect a third condition based on a parameter (e.g., a setting) stored in a storage unit (e.g., a memory or a register), one or more instructions executed during a start-up (e.g., a power-up sequence) of the data storage device 102, or a transition characteristic associated with data to be stored at the non-volatile memory 104, such as a high spatial concentration of data having identical values (e.g., a series of "1"s). Based on detection of the third condition, the identifier 127 may be selected that corresponds to one or more computations associated with data scrambling. For example, the identifier 127 may correspond to one or more computations to select a key to be used during data scrambling and/or to perform data scrambling.

As a fourth example, the condition detection engine 124 may detect a fourth condition based on a parameter (e.g., a setting) stored in a storage unit or one or more instructions executed during a start-up (e.g., a power-up sequence) of the data storage device 102. Based on the detected fourth condition, the identifier 127 may be determined that corresponds to one or more computations associated with performing physical-to-logical address mapping. As a fifth example, the condition detection engine 124 may detect a fifth condition based on identification of data to be written to a location that is associated with an area of the non-volatile memory 104 having wear. Based on the detected fifth condition, the identifier 127 may be determined that corresponds to one or more computations associated with generating extended parity bits.

As a sixth example, the condition detection engine 124 may detect a sixth condition based on a number of read errors, a number of erase operations, a trend indicating an increase in read errors, a trend indicating an increase in read time, or a combination thereof. For example, the sixth condition may be detected based on comparing the number of read errors and/or the number of erase operations to one or more corresponding thresholds. Based on the detected sixth condition, the identifier 127 may be determined that corresponds to one or more computations associated with interleaving data, updating a reference voltage associated with the non-volatile memory 104, adjusting a refresh rate associated with the non-volatile memory 104, or a combination thereof, as illustrative, non-limiting examples.

The condition detection engine 124 may further be configured to generate and/or to identify data 125 based on the detected condition and/or the identifier 127. The data 125 generated by the condition detection engine 124 may be used during performance of the one or more computations that are associated with or correspond to the identifier 127. For example, when the detected condition and/or the identifier 127 are associated with an ECC failure, the data 125 may include uncorrected data that resulted in the ECC failure and soft read data. To illustrate, when particular data read from a location of the non-volatile memory 104 results in the ECC failure, soft read data may be generated by reading storage elements at the location at a higher resolution than was used to read the particular data. The soft read data provides additional data that may be used during performance of one or more heroic recovery computations.

When the detected condition and/or the identifier 127 are associated with wear leveling, the data 125 may include an indication of a wear leveling technique to be applied and/or a reliability measurement, such as a count of write operations, a count of read operations, a count of other memory accesses, a count of a number of errors detected in a block of the non-volatile memory 104, a number of erase operations performed on a block of the non-volatile memory 104, or an elapsed time since data was written to a particular portion of the non-volatile memory 104, as illustrative, non-limiting examples. When the detected condition and/or the identifier 127 are associated with scrambling, the data 125 may include data to be scrambled and/or a value associated with a key to be used during scrambling, as illustrative, non-limiting examples. When the detected condition and/or the identifier 127 are associated with physical-to-logical address mapping, the data 125 may include a mapping table, an indication of one or more bad blocks, and/or an indication of one or more reserved blocks (e.g., replacement blocks), as illustrative, non-limiting examples.

When the detected condition and/or the identifier 127 are associated with generating extended parity bits, the data 125 may include one or more codewords that are to be used to generate the extended parity bits, an indication of a number of parity bits to be generated, or identification of an encoding method to be used to generate the extended parity bits, as illustrative, non-limiting examples. When the detected condition and/or the identifier 127 are associated with adjusting a refresh rate of the non-volatile memory, the data 125 may include the refresh rate to be adjusted, a number of detected errors associated with the non-volatile memory 104, or a number of erase operations performed on the non-volatile memory 104, as illustrative, non-limiting examples. When the detected condition and/or the identifier 127 are associated with interleaving data to be stored at the non-volatile memory 104, the data 125 may include the data to be interleaved, a number of detected errors associated with the non-volatile memory 104, a number of erase operations performed on the non-volatile memory 104, a value of an error threshold, a value of an erase threshold, or an indication of a trend indicating an increase in read errors or read time, as illustrative, non-limiting examples. When the detected condition and/or the identifier 127 are associated with adjusting a reference voltage associated with the non-volatile memory 104, the data 125 may include a reference voltage to be adjusted, an indication of a trend indicating an increase in read errors or read time, a number of detected errors associated with the non-volatile memory 104, or a number of erase operations performed on the non-volatile memory 104, as illustrative, non-limiting examples.

The host device instruction engine 122 may generate an instruction 142 to instruct the host device 130 to perform one or more computations. The instruction 142 may include instruction data 145 and/or a first identifier 147. For example, the instruction 142 may include the first identifier 147 and not the instruction data 145. Additionally or alternatively, the instruction data 145 may include the first identifier 147. The host device instruction engine 122 may generate the instruction 142 based on the identifier 127 and/or the data 125. For example, the host device instruction engine 122 may generate the instruction data 145 based on the data 125 and may generate the first identifier 147 based on the identifier 127. To illustrate, the controller 120 may format and/or encode the data 125 and the identifier 127 to generate the instruction 142 that includes the instruction data 145 (based on the data 125) and the first identifier 147 (based on the identifier 127). In a particular illustrative embodiment, the instruction data 145 is the data 125 and the first identifier 147 is the identifier 127. The controller 120 may send the instruction 142 to the host device 130 to cause the host device 130 to perform the one or more computations associated with the detected condition, as described further herein. Although FIG. 1 illustrates the data storage device 102 sending the instruction 142 as a single instruction, the instruction 142 may be sent as multiple instructions.

The host device 130 may be configured to receive the instruction 142 and to perform one or more computations based on the instruction 142, as described further herein. The host device 130 includes the processor 132 and the driver 134. The driver 134 may include instructions 135 executable by the processor 132 (e.g., a host processor). For example, the instructions 135 may define multiple computations that may each be performed by the processor 132. The multiple computations may be arranged within the driver 134 such that each of the multiple computations is accessible (e.g., retrievable) by the processor 132. The processor 132 may access different sets of one or more computations based on a particular identifier in a received instruction. To illustrate, the host device 130 may determine the one or more computations to be performed by the host device 130 based on the first identifier 147 of the instruction 142. The particular identifier may include an op-code, a procedure call, or an index value, as illustrative, non-limiting examples. The host device 130 may access the driver 134 using the first identifier 147 to retrieve a set of one or more of the instructions 135 that is associated with the one or more computations.

Although the driver 134 is depicted as being included in the host device 130, the driver 134 may be stored at a memory, such as a random access memory (RAM) or the non-volatile memory 104, of the data storage device 102. Accordingly, the processor 132 may be configured to execute a set of one or more instructions (e.g., associated with one or more computations), received from the memory of the data storage device 102, responsive to a condition being detected.

The one or more computations corresponding to the first identifier 147 may be executed by the processor 132. When the instruction 142 includes the instruction data 145, the processor 132 may execute the one or more computations using the instruction data 145. For example, when the first identifier 147 is associated with performing heroics data recovery in response to an ECC failure, the instruction data 145 may include the ECC failure data (e.g., uncorrected data) and soft data bits read from the non-volatile memory 104. "Soft bits" may be collected by reading memory cells to provide additional data to be used in a convergence process (e.g., convergence computations) configured to resolve the uncorrected data. When the instruction 142 does not include the instruction data 145, the processor 132 may execute the one or more computations using other data, such as data (e.g., generated at the host device 130) to be stored at the non-volatile memory 104 of the data storage device 102. For example, when the first identifier 147 is associated with performing data scrambling using a particular key, the processor 132 may scramble data to be stored at the data storage device 102 and send the scrambled data to the data storage device 102.

As a result of the one or more computations being executed by the host processor 132, the processor 132 may generate output data 148, a second identifier 150, or a combination thereof. The output data 148 may be produced based on the execution of the one or more computations and/or may correspond to the identifier. The second identifier 150 may indicate a parameter to be set at the data storage device 102, an operation to be performed at the data storage device 102, or a manner in which the data storage device 102 is to process the output data 148, as illustrative, non-limiting examples. To illustrate, when the first identifier 147 is associated with performing data recovery, such as heroics processing, the output data 148 may include corrected data and the second identifier 150 may be associated with one or more operations to process the output data 148 as the corrected data or to provide an indication that corrected data was unable to be determined. When the first identifier 147 is associated with wear leveling, the output data 148 and/or the second identifier 150 may be associated with identification of a wear leveling technique to be implemented at the data storage device 102. When the first identifier 147 is associated with data scrambling, the output data 148 may include scrambled data and/or a key associated with data scrambling. The second identifier 150 may indicate that the output data 148 includes the scrambled data and/or the key, or the second identifier 150 may correspond to a particular key to be used by the data storage device 102 to scramble data. When the first identifier 147 is associated with physical-to-logical address mapping, the output data 148 may include a mapping table to be stored at the data storage device 102, and the second identifier 150 may be associated with one or more operations to store the output data 148 (e.g., the mapping table) at the data storage device 102.

When the first identifier 147 is associated with generating extended parity bits, the output data 148 may include the extended parity bits, and the second identifier 150 may be associated with one or more operations to store the extended parity bits. When the first identifier 147 is associated with adjusting a memory refresh rate, the output data 148 may include an adjusted refresh rate or an amount the memory refresh rate is to be adjusted, and the second identifier 150 may be associated with one or more operations to adjust the memory refresh rate and/or store the adjusted memory refresh rate. When the first identifier 147 is associated with interleaving, the output data 148 may include interleaved data and the second identifier 150 may be associated with one or more operations to store the interleaved data. When the first identifier 147 is associated with adjusting a reference voltage, the output data 148 may include an adjusted reference voltage or an amount the reference voltage is to be adjusted, and the second identifier 150 may be associated with one or more operations to adjust the reference voltage and/or store the adjusted reference voltage.

The host device 130 may generate a response 149 based on execution of the one or more conditions. The host device 130 may send the response 149 to the data storage device 102. Although FIG. 1 illustrates the host device 130 sending the response 149 as a single response, the response 149 may be sent as multiple responses.

The response 149 may include the output data 148, the second identifier 150, or a combination thereof. For example, the response 149 may include the second identifier 150 and not the output data 148. As another example, the response 149 may include the output data 148 and not the second identifier 150. Additionally or alternatively, the output data 148 may include the second identifier 150.

The data storage device 102 may receive and process the response 149. The response 149 may be processes based on whether the response 149 includes the output data 148, the second identifier 150, or a combination thereof. When the response 149 includes the output data 148 and not the second identifier 150, the controller 120 may process the output data 148 based on the identifier 127 used to generate the instruction 142. For example, the instructions 112 may identify one or more operations or functions for the controller 120 to be performed using the output data 148 based on the identifier 127. To illustrate, when the data storage device 102 receives the response 149, the controller 120 may identify the identifier 127, such as by accessing a register, storage unit, or the non-volatile memory 104 that stores the identifier 127. The controller 120 may determine one or more operations to be performed based on the identifier 127. For example, the controller 120 may access the one or more data structures 114, such as an identifier to operations mapping included in the one or more data structures 114, to determine (e.g., identify) the one or more operations. The identifier to operations mapping may enable the controller 120 to translate the identifier 127 into the one or more operations that may be used to process the output data 148. To illustrate, when the output data 148 includes the extended parity bits, the controller 120 may retrieve the identifier 127, access the one or more data structures 114, and identify one or more operations to be performed by the controller 120, such as operations for storing the extended parity bits in the non-volatile memory 104.

When the response 149 includes the second identifier 150 and not the output data 148, the host device instruction engine 122 may identify and/or detect the second identifier 150. The instruction identifier engine 126 may translate the identified second identifier 150 into one or more operations (e.g., one or more functions) to be performed by the controller 120 using the one or more data structures 114. The one or more operations based on the second identifier 150 may be performed by the controller 120 to set an operating parameter of the data storage device 102 or to process data (e.g., the data 125, data to be stored at the non-volatile memory 104, or data previously stored at the non-volatile memory 104), as illustrative, non-limiting examples. To illustrate, when the response 149 is received at the data storage device 102 responsive to a particular instruction 142 associated with determining a wear leveling technique to be applied at the data storage device 102, the second identifier 150 may identify (e.g., correspond to) a particular wear leveling technique. The instruction identifier engine 126 may access the one or more data structures 114 to determine one or more operations to be performed by the controller 120. For example, the controller 120 may perform one or more operations to set a parameter of the data storage device 102 to a value that corresponds to the particular wear leveling technique associated with the second identifier 150. After setting the parameter, the controller 120 may implement the particular wear leveling technique.

When the response 149 includes the output data 148 and the second identifier 150, the controller 120 may process the output data 148 based on the second identifier 150. The instruction identifier engine 126 may determine one or more operations (e.g., one or more functions) based on the second identifier 150. The controller 120 may then process the output data 148 based on the one or more operations. For example, the output data 148 may include a physical-to-logical address mapping table and the second identifier 150 may be associated with one or more operations to store the physical-to-logical address mapping table.

During operation, the controller 120 may detect one or more conditions present in the data storage device 102 during the operation of the data storage device 102, such as operation of the data storage device 102 at any time including and/or between power-up and shut down of the data storage device 102. Based on detection of a particular condition, the controller 120 may determine a particular identifier 127 and may identify particular data 125 associated with the particular condition. The particular identifier 127 may correspond to one or more specified computations to be performed responsive to the particular condition, such as one or more specified computations to be performed using the data 125. Based on the detection of the particular condition, the controller 120 may generate the instruction 142. The controller 120 may provide the instruction to the host device 130 to cause the host device 130 to perform one or more specified computations at the processor 132 of the host device 130.

The data storage device 102 may receive the output data 148 and the second identifier 150 from the host device 130. The output data 148 and the second identifier 150 may be associated with a result of execution of the one or more specified calculations by the processor 132 of the host device 130. The output data 148 and the second identifier 150 may be received at the controller 120 to be processed. The host device instruction engine 122 of the controller 120 may detect and/or identify the second identifier 150. For example, the instruction identifier engine 126 may translate the identified second identifier 150 into one or more operations (e.g., one or more functions) to be performed by the controller 120. The controller 120 may execute the one or more operations using the output data 148 received from the host device 130. Accordingly, the controller 120 may be configured to process the received output data 148 based on the second identifier 150.

In a first illustrative example, the data storage device 102 may receive a read data request from the host device 130 and the controller 120 may initiate a read operation of a location of the non-volatile memory 104 based on the read data request. The controller 120 may receive read data from the location and may perform an ECC operation on the read data using an ECC engine (not shown). The condition detection engine 124 may detect an ECC failure, such as one or more uncorrectable errors associated with uncorrected data. In response to detection of the ECC failure, the controller 120 may initiate one or more soft read operations of the non-volatile memory 104 to produce soft bit data. The condition detection engine 124 may produce the data 125 that includes the soft bit data and the uncorrected data. Additionally, the instruction identifier engine 126 may determine a particular identifier, such as the identifier 127, that is associated with the ECC failure. The host device instruction engine 122 may generate the instruction 142 that includes the instruction data 145 (based on the data 145) and the first identifier 147 (based on the identifier 127).

The data storage device 102 may send the instruction 142 to the host device 130 to cause the host device 130 to execute one or more specified computations associated with the first identifier 147. The one or more specified computations may be associated with heroics processing (e.g., convergence processing) to produce corrected data after a detected ECC failure. For example, the host processor 132 may execute the one or more specified computations, such as one or more heroics operations (e.g., one or more convergence operations), on the instruction data 145 to generate the corrected data. The corrected data may be provided from the host device 130 to the data storage device 102 as the output data 148.

The data storage device 102 may receive the output data 148 (e.g., the corrected data) and write the corrected data to the location (of the read data request) or to a different location of the non-volatile memory 104. The data storage device 102 may then send the corrected data to the host device 130 as data responsive to the read data request (e.g., the host device 130 may have generated the corrected data without knowing that the corrected data corresponds to the read data request sent by the host device 130 to the data storage device 102). If the data storage device 102 writes the corrected data to the different location of the non-volatile memory 104, the controller 120 may update an addressing table to reflect the corrected data stored in the different location and may provide an address associated with the different location to the host device 130.

In a second illustrative example, the condition detection engine 124 may detect a particular condition based on a reliability measurement. The reliability measurement may include a count of write operations, a count of read operations, a count of other memory accesses, a count of a number of times errors are detected in a block of the non-volatile memory 104, a number of erase operations performed on a block of the non-volatile memory 104, or an elapsed time since data was written to a particular portion of the non-volatile memory 104, as illustrative, non-limiting examples. Based on a value of at least one reliability measure, the condition detection engine 124 may generate the data 125 associated with one or more reliability measurements and the instruction identifier engine 126 may determine an identifier 127 corresponding to wear leveling operations. The host device instruction engine 122 may generate the instruction 142 that includes instruction data 145 (based on the one or more reliability measurements) and the first identifier 147 (based on the identifier 127 that corresponds to the one or more wear leveling operations).

The host device 130 may receive the instruction 142 and may execute one or more specified computations, based on the first identifier 147, associated with wear leveling of the non-volatile memory 104. For example, the host processor 132 may execute the one or more specified computations on the instruction data 145 (e.g., the one or more reliability measurements) to determine whether a wear leveling technique should be applied at the data storage device 102 and, if so, which wear leveling technique is to be applied. For example, the host processor 132 may determine values of the one or more reliability measures, compare the values to one or more thresholds, and select the wear leveling technique, according to a predetermined selection process. As another example, the host processor 132 may determine the wear leveling technique by analyzing wear associated with each die of multiple dies of the non-volatile memory 104. The host processor 132 may send, to the data storage device 102, the second identifier 150 that corresponds to the wear leveling technique to be applied at the data storage device 102.

The data storage device 102 may receive the second identifier 150 and the instruction identifier engine 126 may determine the wear leveling technique based on the second identifier 150. For example, the instruction identifier engine 126 may identify the wear leveling technique using the one or more data structures 114. The controller 120 may implement the identified wear leveling technique on the non-volatile memory 104 to transfer data between memory elements of a memory die so as to distribute wear among memory elements within the memory die or to distribute the wear among multiple dies of the non-volatile memory 104.

In a third illustrative example, the data storage device 102 may receive a write data request from the host device 130. An ECC engine (not shown) associated with the controller 120 may generate one or more codewords in response to the write data request. The controller 120 may identify a location of the non-volatile memory 104 where the data (e.g., the one or more codewords) is to be written. The condition detection engine 124 may detect that the location is associated with an area of the non-volatile memory 104 having wear. Based on the wear associated with the location, the instruction identifier engine 126 may determine an identifier 127. The identifier 127 may correspond to one or more extended parity computations. The host device instruction engine 122 may generate the instruction 142 that includes instruction data 145 (based on the one or more codewords to be written to the non-volatile memory 104) and the first identifier 147 (based on the identifier 127 that corresponds to the one or more extended parity computations).

The host device 130 may receive the instruction 142 and may execute one or more specified computations based on the first identifier 147. The one or more specified computations may be associated with generating (e.g., calculating) extended parity bits for the instruction data 145 (e.g., the one or more codewords). The host processor 132 may send the extended parity bits to the data storage device 102 as the output data 148. The data storage device 102 may receive the output data 148 (e.g., the extended parity bits) and write the extended parity bits and the one or more codewords to the non-volatile memory 104.

In a fourth illustrative example, the data storage device 102 may instruct the host device 130 to scramble data prior to sending the data to the data storage device 102 as part of a write data request. For example, the data storage device 102 may instruct the host device 130 to scramble data having a particular transition characteristic, such as a high spatial concentration of data having identical values (e.g., a series of "1"s). The data storage device 102 may be programmed to instruct the host device 130 to scramble data based on a parameter (e.g., a setting) stored in the non-volatile memory 104 or based on one or more instructions of the instructions 112 executed by the controller 120, such as one or more instructions executed during a start-up procedure (e.g., a power-up sequence) of the data storage device 102. The condition detection engine 124 may detect the parameter or the one or more instructions and may determine the data 125, such as a value of a key to be used by the host device 130 to generate scrambled data. The instruction identifier engine 126 may determine an identifier 127 that corresponds to one or more scrambling computations. The host device instruction engine 122 may generate the instruction 142 that includes instruction data 145 (based on the value of the key) and the first identifier 147 (based on the identifier 127 that corresponds to the one or more scrambling computations).

The host device 130 may receive the instruction 142 and execute one or more specified computations associated with generating scrambled data. For example, the host processor 132 may execute the one or more specified computations to detect data having the particular characteristic and, when the data is detected, to use the instruction data 145 (e.g., the value of the key) on the data to generate the scrambled data. The host device 130 may send the scrambled data to the data storage device 102 as the output data 148. The output data 148 may include an indication of the key that was used to generate the scrambled data. Alternatively or additionally, the host device 130 may send the second identifier 150 with the output data 148. The second identifier 150 may correspond to an indication that the output data 148 is to be stored in the non-volatile memory 104 and is scrambled data. The controller 120 may cause the scrambled data (e.g., the output data 148) and the key to be stored at the non-volatile memory 104.

Identifiers, such as the identifier 127, the first identifier 147, and the second identifier 150 may each be associated with one or more computations and/or one or more operations to enable the data storage device 102 to offload processing to the host device 130. When each of the identifiers is one byte in length, there may be $2^8=256$ different identifiers that may be designated. To illustrate, a first identifier value of "00000000" may correspond to one or more computations to perform heroics to recover a data value based on soft bit data. A second identifier value of "00000001" may correspond to one or more computations (e.g., functions) to scramble data to be stored at the non-volatile memory 104. A third identifier value of "00000010" may correspond to one or more computations to determine a wear-leveling technique to be applied by the controller 120. A fourth identifier value of "00000011" may correspond to one or more computations to maintain a physical-to-logical address table. Although the identifiers have been described as being one byte long (e.g., eight bits), the identifiers may be more than or less than one byte long.

While the host device 130 is performing the one or more computations, the data storage device 102 may be enabled to perform one or more other operations, such as one or more data read operations and/or one or more data write operations on the non-volatile memory 104. For example, when the instruction 142 is associated with the host device 130 performing one or more computations to identify a wear leveling technique, the controller 120 may perform one or more operations prior to receiving an indication of the wear leveling technique to be implemented. Alternatively, while the host device 130 is performing the one or more computations, the data storage device 102 may be prohibited from performing one or more other operations. For example, when the instruction 142 is associated with the host device 130 scrambling data included in the instruction 142, the controller 120 may wait to receive and write scrambled data before the controller 120 performs one or more other operations. When the non-volatile memory 104 is a multi-layer flash memory, while the controller 120 is waiting for the host device 130 to provide scrambled data so that the controller 120 can write the scrambled data to the first die, the controller 120 may perform one or more operations to dies other than the first die, such as one or more operations performed on the second die, Additionally, while the host device 130 is performing the one or more computations based on the instruction 142, the controller 120 may perform one or more operations in parallel with the host device 130 performing the one or more computations. For example, when the instruction 142 is associated with calculating extended parity bits based on one or more codewords, the controller 120 may store the one or more codewords at the non-volatile memory 104 while the host device 130 is determining the extended parity bits based on one or more codewords By instructing the host device 130 to perform the one or more specified computations, the data storage device 102 may be simplified as compared to other data storage devices that perform the one or more specified computations. For example, the host processor 132 may have spare execution cycles that may be utilized to perform one or more specified computations. Additionally, the controller 120 may be able to perform other operations, such as read and write operations, while the host device executes the one or more specified operations.

Figure 2:
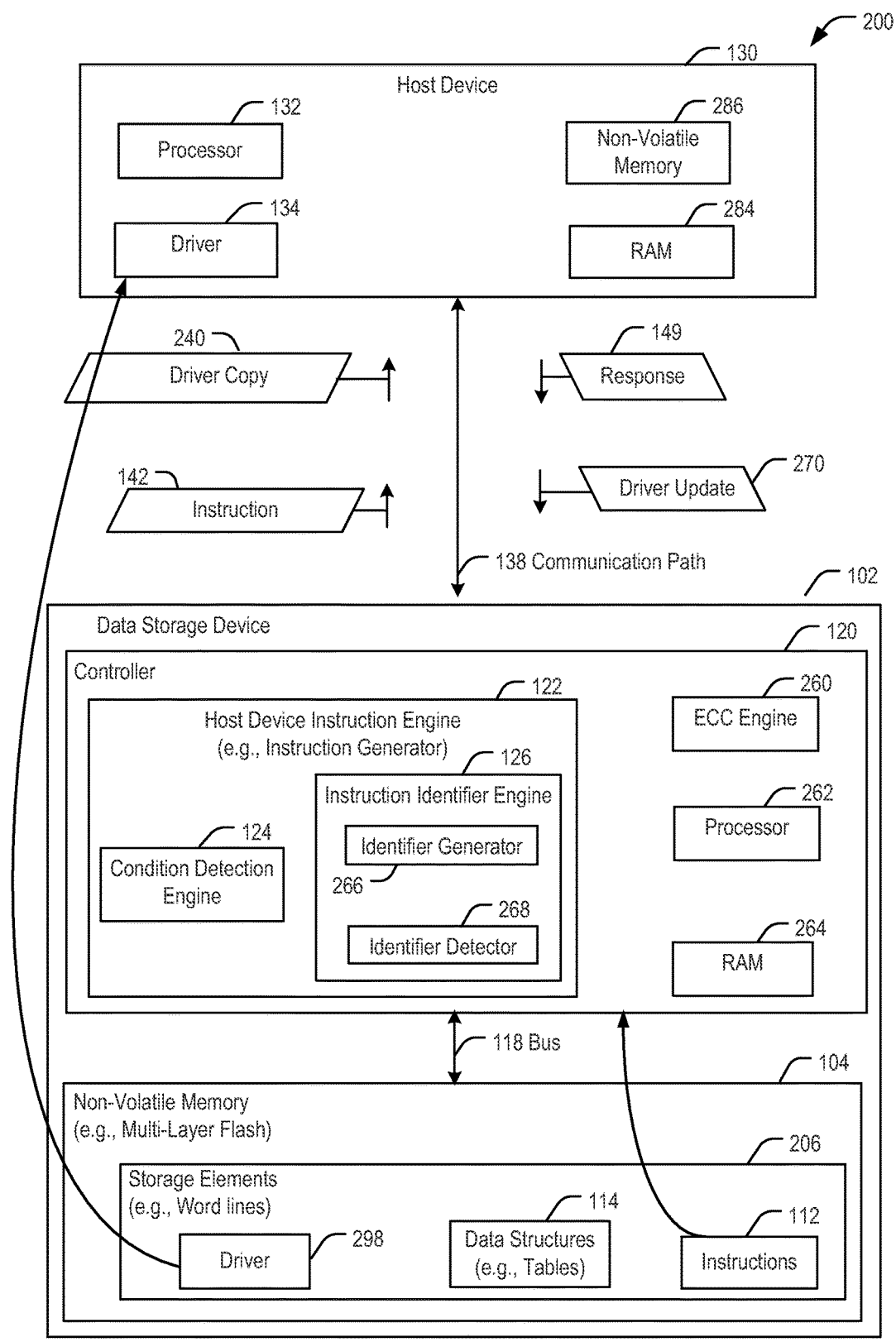
FIG. 2 is a block diagram illustrating a particular embodiment of components that may be incorporated in the data storage device of FIG. 1.

Referring to FIG. 2, a particular illustrative embodiment of the data storage device 102 of FIG. 1 showing additional detail of the data storage device 102 and the host device 130 is depicted.

The host device 130 may include the processor 132, the driver 134, a random access memory (RAM) 284, and a non-volatile memory 286. The non-volatile memory 286 and the RAM 284 may provide storage space that is accessible to the processor 132. For example, the processor 132 may use the RAM 284 to store data associated with the processor 132 performing the one or more computations in response to the instruction 142, such as one or more computations specified by the instruction 142. Although the driver 134 is depicted as being separate from the RAM 284 and the non-volatile memory 286, the driver 134 may be stored at the RAM 284 and/or at the non-volatile memory 286.

The data storage device 102 may include the controller 120 and the non-volatile memory 104. The controller 120 may include the host device instruction engine 122, an Error Correction Code (ECC) engine 260, a processor 262, and a RAM 264. The host device instruction engine 122 may include the condition detection engine 124 and the instruction identifier engine 126. The instruction identifier engine 126 may include an identifier generator 266 and an identifier detector 268. The identifier generator 266 may be configured to generate one or more identifiers, such as the identifier 127 of FIG. 1. For example, the identifier generator 266 may generate each of the one or more identifiers based on the one or more data structures 114, such as a mapping table that includes entries that associate conditions to identifiers. The one or more identifiers produced by the identifier generator 266 may be used by the host device instruction engine 122 to generate one or more instructions, such as the instruction 142. The identifier detector 268 may be configured to detect one or more identifiers, such as the second identifier 150, received from the host device 130. The identifier detector 268 may be responsive to the response 149 received from the host device 130 and may be configured to access the one or more data structures 114, such as the identifier to operation mapping, to determine one or more operations to be performed by the controller 120 based on the second identifier 150 received in the response 149.

The ECC engine 260 may be configured to receive data to be stored to the non-volatile memory 104 and to generate a codeword. Prior to storage, data may be encoded by an ECC encoder to generate redundant information (e.g., "parity bits") that may be stored with the data as the codeword. For example, the ECC engine 260 may include an encoder configured to encode data using an ECC encoding scheme, such as a Reed Solomon encoder, a Bose-Chaudhuri-Hocquenghem (BCH) encoder, a low-density parity check (LDPC) encoder, a Turbo Code encoder, an encoder configured to encode data according to one or more other ECC encoding schemes, or any combination thereof, as illustrative, non-limiting examples. The ECC engine 260 may further include a decoder configured to decode data read from the non-volatile memory 104 to detect and correct, up to an error correction capability of the ECC scheme, bit errors that may be present in the data. If the ECC engine 260 is unable to correct one or more errors, the ECC engine 260 may indicate an ECC failure. An indication of the ECC failure may be detected by the condition detection engine 124.

The processor 262 may be configured to execute the instructions 112. The RAM 264 may provide storage space that is accessible to one or more components of the controller 120, such as the processor 262. For example, the processor 262 may use the RAM 264 to store data associated with the processor 262 executing one or more of the instructions 112. As compared to the host device 130, the processor 262 of the data storage device 102 may have less processing power than the processor 132 of the host device 130 and the RAM 264 of the data storage device 102 may have a smaller capacity (e.g., less storage space) than the RAM 238 of the host device 130. Additionally, the RAM 264 of the data storage device 102 may be smaller than a RAM of another data storage device that does not offload the one or more computations.

The non-volatile memory 104 may include a plurality of storage elements 206. The plurality of storage elements 206 may include one or more dies that are each configured into multiple blocks. A block may be a smallest amount of the non-volatile memory 104 that may be erased based on execution of a single erase operation. Each of the multiple blocks may have a plurality of word lines that each includes one or more storage elements (e.g., one or more memory cells). A word line may be a smallest amount of the non-volatile memory 104 that may be written to based on execution of a single write operation.

The driver 298, the one or more data structures 114, and the instructions 112 may be stored in the plurality of storage elements 206. The driver 298, the one or more data structures 114, and/or the instructions 112 may be stored in the non-volatile memory 104 using one or more blocks and/or one or more dies of the non-volatile memory 104. The instructions 112, such as firmware for the controller 120, may be provided to the RAM 264 during operation of the data storage device 102 for one or more components of the controller 120 to access the instructions 112. The driver 298 may be configured to be provided to one or more host devices, such as the host device 130, to enable each host device to perform one or more computations specified by the data storage device 102. For example, the driver 298 may include a plurality of instructions executable by a processor to perform one or more computations.

In response to the host device 130 detecting that the data storage device 102 is coupled to the host device 130, the host device 130 may initiate an authentication procedure (e.g., an initialization procedure). For example, when the data storage device 102 is embedded in the host device 130, the host device 130 may detect the data storage device 102 during a power-up of the host device 130. During the authentication procedure, the host device 130 may determine whether the host device 130 includes the driver 134 that corresponds to the driver 298 of the data storage device 102. If the host device 130 includes the driver 134, the host device 130 may validate (e.g., based on a comparison of a first driver version number of the driver 134 to a second driver version number of the driver 298) whether or not the driver of the host device 130 corresponds to the driver 298 of the data storage device 102. For example, the driver 134 at the host device 130 may have been received from the data storage device 102, received from another data storage device, or received (e.g., received prior to the authentication procedure) from a server associated with the data storage device 102. When the driver 134 corresponds to the driver 298 of the data storage device 102, the host device 130 may proceed to conclude the authentication procedure.

When the host device 130 is unable to validate (e.g., verify) that the driver 134 of the host device corresponds to the driver 298 of the data storage device 102 or when the host device 130 does not have the driver 134, the host device 130 may obtain the driver 134 that corresponds to the driver 298 of the data storage device 102. To obtain the driver 134, the host device 130 may request the driver 298 from the data storage device 102. For example, the data storage device 102 may provide the host device 130 with a copy 240 of the driver 298 stored at the non-volatile memory 104. To illustrate, the controller 120 of the data storage device 102 may generate the copy 240 (e.g., a driver copy) of the driver 298, and the data storage device 102 may send the copy 240 to the host device 130. The host device 130 may receive the copy 240 and store the copy 240 as the driver 134. For example, the host device 130 may store the driver 134 at the non-volatile memory 286, at the RAM 284, or at another memory that is accessible to the processor 132 and that is associated with the host device 130, as illustrative, non-limiting examples. Although FIG. 2 depicts the driver 134 being received from the data storage device 102, alternatively, the host device 130 may request and receive the driver 134 from a server associated with the data storage device 102. For example, the host device 130 may receive the driver 134 from the server via a network, such as the Internet. After the host device 130 obtains the driver 134 that corresponds to the driver 298 of the data storage device 102, the host device 130 may proceed to conclude the authentication procedure.

Additionally or alternatively, as part of the authentication procedure or subsequent to the authentication procedure, the host device 130 may be configured to provide a driver update 270 to the data storage device 102. For example, the host device 130 may receive the driver update 270 from a server associated with the data storage device 102. For example, the host device 130 may receive the driver update 270 from the server via a network, such as the Internet. The data storage device 102 may receive the driver update 270 and may update the driver 298 based on the driver update 270. For example, the driver update 270 may be provided to the controller 120 and the controller 120 may update the driver 298 stored in the non-volatile memory 104. Additionally or alternatively, the driver update 270 may be configured to update data stored in the non-volatile memory 104 other than the driver 298. To illustrate, the driver update 270 may be configured to update the instructions 112 or the one or more data structures 114, as illustrative, non-limiting examples.

During operation, the data storage device 102 may receive a request from the host device 130 to provide the copy 240 of the driver 298 stored at the non-volatile memory 104 of the data storage device 102. The controller 120 may generate the copy 240 of the driver 298 and the data storage device 102 may send the copy 240 to the host device 130.

By providing the copy 240 of the driver 298 to the host device 130, the data storage device 102 may enable the host device 130 to perform one or more computations based on the instruction 142 sent by the data storage device 102. For example, the data storage device 102 may be able to offload processing to the host device 130 to utilize the processor 132 and the RAM 284 of the host device 130. The processor 132 of the host device 130 may have more processing power than the processor 262 of the data storage device 102 and the RAM 238 of the host device 130 may have a larger capacity (e.g., more storage space) than the RAM 264 of the data storage device 102. Additionally, by offloading the processing (e.g., execution of the one or more computations) to the host device 130, the RAM 264 of the data storage device 102 may be smaller than a RAM of another data storage device that does not offload the one or more computations. Further, the instructions 112 of the data storage device 102 may not be as complex as compared to data storage devices that do not offload the one or more computations because the instructions 112 do not need to support the computations offloaded to the host device 130 as compared to instructions of data storage devices that are configured to support and perform the one or more computations.

Figure 3:
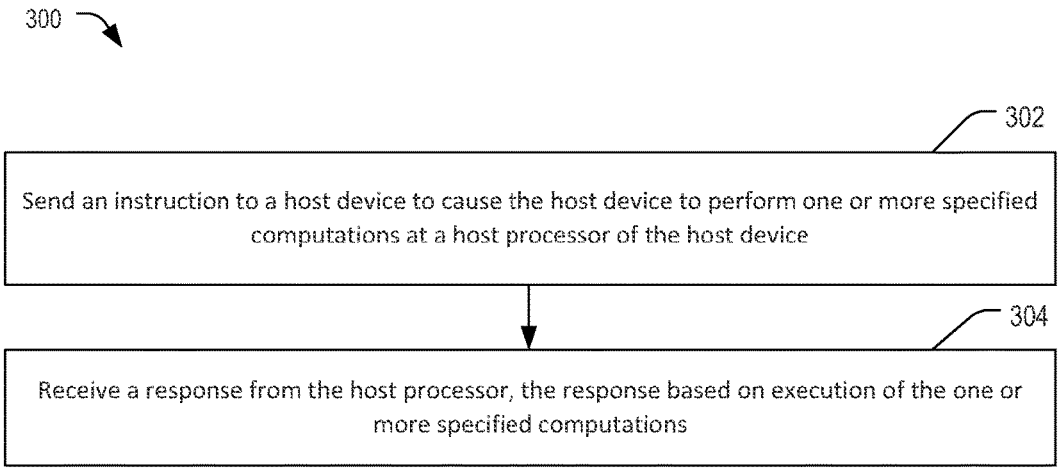
FIG. 3 is a flow chart of an illustrative embodiment of a method of instructing a host device to perform one or more computations.

Referring to FIG. 3, a particular embodiment of a method 300 of instructing a host device to perform one or more computations is depicted. The method 300 may be performed in a data storage device that includes a controller and a non-volatile memory. For example, the method 300 may be performed in the data storage device 102 of FIG. 1. The controller and the non-volatile memory may include or correspond to the controller 120 and the non-volatile memory 104 of FIG. 1, respectively.

The method 300 includes sending an instruction to a host device to cause the host device to perform on or more specified computations at a host processor of the host device, at 302. The instruction may include the instruction 142 of FIG. 1. The instruction may include an identifier, such as the identifier 147 of FIG. 1, or may include the identifier and instruction data, such as the identifier 147 and the instruction data 145 of FIG. 1. The host device may include the host device 130 of FIG. 1.

The method 300 includes receiving a response from the host processor, the response based on execution of the one or more specified computations, at 304. The host device may perform the one or more specified computations to generate the response, such as the response 149 of FIG. 1.

In some implementations, the method 300 may include providing a copy of a driver stored at the memory of the data storage device to the host device. The driver may define a plurality of computations that include the one or more specified computations. For example, the driver may include the driver 298 of FIG. 2 and the copy may include the driver copy 240 of FIG. 2. In other implementations, the method 300 may include receiving a driver update from the host device and updating a driver stored at the non-volatile memory based on the driver update, such as updating the driver 298 stored at the non-volatile memory 104 based on the driver update 270.

Figure 4:
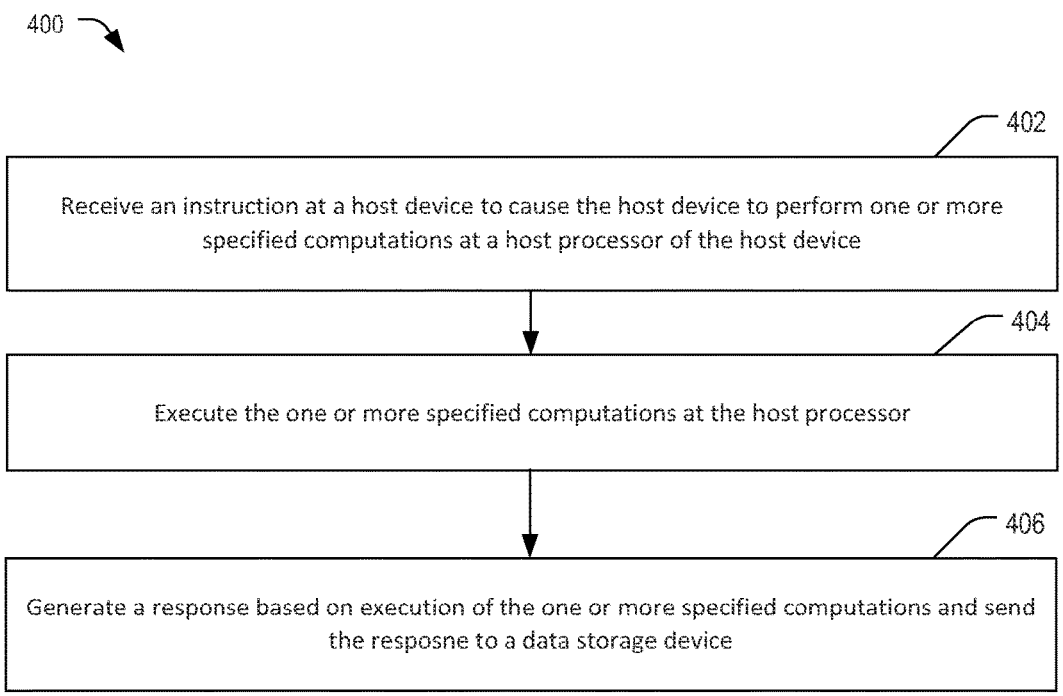
FIG. 4 is a flow chart of an illustrative embodiment of a method of performing one or more computations responsive to a received instruction.

Referring to FIG. 4, a particular embodiment of a method 400 of performing one or more computations responsive to a received instruction is depicted. The method 400 may be performed in a host device that includes a processor. For example, the method 400 may be performed in the host device 130 including the host processor 132 of FIG. 1.

The method 400 includes receiving an instruction at a host device to perform one or more specified computations at a host processor of the host device, at 402. The instruction may include the instruction 142 of FIG. 1. The instruction may include an identifier, such as the identifier 147 of FIG. 1, or may include the identifier and instruction data, such as the instruction data 145 of FIG. 1. The instruction may be received from a data storage device, such as the data storage device 102 of FIG. 1. The one or more specified computations may be defined in a driver, such as the driver 134 of FIG. 1, stored at the host device.

The method 400 includes executing the one or more specified computations at the host processor, at 404, and generating a response based on execution of the one or more specified computations and sending the response to a data storage device, at 406. The response may include the response 149 of FIG. 1. The response may include output data, such as the output data 148, and/or an identifier, such as the second identifier 150 of FIG. 1.

In some implementations, the method 400 may include authenticating (e.g., initializing) the data storage device. As part of an authentication process, the host device may verify that the host device includes a driver, such as the driver 134 of FIG. 1, that corresponds to a driver, such as the driver 298 of FIG. 2, of the data storage device. When the host device does not include a driver that corresponds to the driver of the data storage device, the host device may receive a copy of the driver of the data storage device, such as the driver copy 240 of FIG. 2. Additionally or alternatively, the method 400 may include providing a driver update to the data storage device. For example, the driver update may include the driver update 270 of FIG. 2. The driver update may enable the data storage device to update a particular driver stored at a non-volatile memory of the data storage device.

Although various components of the data storage device 102 depicted herein are illustrated as block components and described in general terms, such components may include one or more microprocessors, state machines, or other circuits configured to enable the controller 120 of FIG. 1 and/or the processor 260 of FIG. 2 to send an instruction to a host device to cause the host device to perform one or more specified computations at a host processor of the host device. Alternatively or additionally, the components may include one or more microprocessors, state machines, or other circuits configured to enable the controller 120 of FIG. 1 and/or the processor 260 of FIG. 2 to receive a response from the host device, the response based on execution of the one or more specified computations. For example, the controller 120 and/or the processor 262 may represent physical components, such as hardware controllers, state machines, logic circuits, or other structures, to enable the controller 120 of FIG. 1 and/or the processor 260 of FIG. 2 to send an instruction to a host device to cause the host device to perform one or more specified computations at a host processor of the host device. As another example, the controller 120 and/or the processor 262 may represent physical components, such as hardware controllers, state machines, logic circuits, or other structures, to enable the controller 120 of FIG. 1 and/or the processor 260 of FIG. 2 to receive a response from the host device. As a further example, the controller 120 and/or the processor 262 may represent physical components, such as hardware controllers, state machines, logic circuits, or other structures, to enable the controller 120 of FIG. 1 and/or the processor 260 of FIG. 2 to provide a copy of a driver stored at the non-volatile memory of the data storage device to the host device and/or to update the driver stored at the non-volatile memory based on a driver update received from the host device.

The controller 120 of FIG. 1 and/or the processor 260 of FIG. 2 may be implemented using a microprocessor or microcontroller programmed to perform the method 300 of FIG. 3. In a particular embodiment, the microprocessor or the microcontroller is programmed to detect a condition that is present at the data storage device. The microprocessor or microcontroller may further be programmed to access a mapping table that includes entries that associate conditions to identifiers based on the detected condition. The microprocessor or microcontroller may further be programmed to generate an instruction based on the identifier and to initiate transmission of the instruction to the host device. In a particular embodiment, the microprocessor or microcontroller may further be programmed to generate data responsive to detection of the condition. The microprocessor or microcontroller may further be programmed to receive and/or process a response that is responsive to the instruction from the host device. In a particular embodiment, the controller includes a processor executing instructions that are stored at the non-volatile memory 104. Alternatively, or in addition, executable instructions that are executed by the processor may be stored at a separate memory location that is not part of the non-volatile memory 104, such as at a read-only memory (ROM).

Although various components of the host device 130 depicted herein are illustrated as block components and described in general terms, such components may include one or more microprocessors, state machines, or other circuits configured to enable the processor 132 of FIG. 1 to receive an instruction to cause the host device to perform one or more specified computations. Alternatively or additionally, the components may include one or more microprocessors, state machines, or other circuits configured to enable the processor 132 of FIG. 1 to execute the one or more specified computations and to generate a response based on execution of the one or more specified computations. Alternatively or additionally, the components may include one or more microprocessors, state machines, or other circuits configured to enable the processor 132 of FIG. 1 to send the response to a data storage device. For example, the processor 132 may represent physical components, such as hardware controllers, state machines, logic circuits, or other structures, to enable the processor 132 of FIG. 1 to receive an instruction to cause the host device to perform one or more specified computations. As another example, the processor 132 may represent physical components, such as hardware controllers, state machines, logic circuits, or other structures, to enable the processor 132 of FIG. 1 to execute the one or more specified computations to generate the response. As a further example, the processor 132 may represent physical components, such as hardware controllers, state machines, logic circuits, or other structures, to enable the processor 132 of FIG. 1 to send the response to a data storage device.

The processor 132 of the host device 130 may be implemented using a microprocessor or microcontroller programmed to perform the method 400 of FIG. 4. In a particular embodiment, the microprocessor or the microcontroller is programmed to detect and authenticate (e.g., initialize) a data storage device, such as the data storage device 102 of FIG. 1. The microprocessor or microcontroller may further be programmed to verify that the host device 130 includes a driver corresponding to a particular driver stored at the data storage device. When the host device 130 includes the driver, the microprocessor or microcontroller may further be programmed to receive an instruction to cause the processor 132 to perform one or more specified computations. The microprocessor or microcontroller may further be programmed to detect an identifier included in the instruction and to select the one or more computations from a plurality of computations defined by the driver. The microprocessor or microcontroller may further be programmed to execute the one or more computations to generate a response. The microprocessor or microcontroller may further be programmed to send the response to the data storage device. In a particular embodiment, the processor 132 executes instructions that are stored at a non-volatile memory, such as the non-volatile memory 286. Alternatively, or in addition, executable instructions that are executed by the processor 132 may be stored at a separate memory location that is not part of the non-volatile memory 286, such as at a read-only memory (ROM).

In a particular embodiment, the data storage device 102 may be attached or embedded within one or more host devices, such as within a housing of a host communication device. However, in other embodiments, the data storage device 102 may be implemented in a portable device configured to be selectively coupled to one or more external devices. For example, the data storage device 102 may be within a packaged apparatus such as a wireless telephone, a tablet computer, a personal digital assistant (PDA), a gaming device or console, a portable navigation device, or other device that uses internal non-volatile memory. In a particular embodiment, the data storage device 102 may be coupled to a non-volatile memory, such as a three-dimensional (3D) memory, a flash memory (e.g., NAND, NOR, Multi-Level Cell (MLC), a Divided bit-line NOR (DINOR) memory, an AND memory, a high capacitive coupling ratio (HiCR), asymmetrical contactless transistor (ACT), or other flash memories), an erasable programmable read-only memory (EPROM), an electrically-erasable programmable read-only memory (EEPROM), a read-only memory (ROM), a one-time programmable memory (OTP), or any other type of memory.

The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
  in a data storage device including a controller and a non-volatile memory, performing:
    determining an instruction identifier based on a condition detected by the controller and based on a condition-to-identifier mapping that maps the condition to the instruction identifier;
    sending an instruction based on the instruction identifier to a host device to cause the host device to perform one or more specified computations at a processor of the host device;
    receiving a response from the processor, wherein the response:
      includes output data and an operation identifier, and
      is based on performance of the one or more specified computations; and
    performing an operation based on the instruction identifier and based on a mapping of the operation identifier to the operation.

2. The method of claim 1, wherein:
  the instruction identifier indicates the one or more specified computations, and
  the operation identifier indicates one or more specified operations, the one or more specified operations to be performed by the controller using one or more data structures that store the condition-to-identifier mapping.

3. The method of claim 1, further comprising:
  sending, from the data storage device, data to be used by the host device during performance of the one or more specified computations, and
  processing the response at the data storage device by accessing a data structure that includes an identifier-to-operation mapping that maps the operation identifier to the operation.

4. The method of claim 1, wherein:
  the condition corresponds to an error correction code failure that is determined to be uncorrectable by an error correction coding (ECC) engine of the data storage device, and
  the one or more specified computations are associated with heroics performed subsequent to the error correction code failure.

5. The method of claim 4, wherein the instruction includes error data associated with one or more soft reads performed on the non-volatile memory in response to the error correction code failure.

6. The method of claim 1, wherein:
the one or more specified computations are associated with wear leveling of the non-volatile memory, and
the instruction includes parameter data associated with the non-volatile memory.

7. The method of claim 1, wherein:
the one or more specified computations are associated with generating extended parity bits, and
the response includes the extended parity bits to be stored at the non-volatile memory.

8. The method of claim 1, wherein:
the one or more specified computations are associated with a scrambling operation, and
the response includes scrambled data to be stored at the non-volatile memory.

9. The method of claim 1, wherein the operation identifier indicates one or more of:
a parameter to be set at the data storage device;
an operation to be performed by the data storage device; or
a manner in which the data storage device is to process output data, wherein the output data is associated with the instruction identifier or the one or more specified computations.

10. The method of claim 1, wherein the non-volatile memory comprises a resistive random-access memory (Re-RAM) or a multi-layer flash memory.

11. The method of claim 1, further comprising retrieving the instruction identifier from a memory of the data storage device based on the response.

12. The method of claim 1, wherein:
the instruction identifier includes an op-code or a procedure call corresponding to the instruction, and
sending the instruction to the host device includes sending the op-code or the procedure call to the host device.

13. The method of claim 1, wherein the condition-to-identifier mapping includes a data structure that maps:
a first condition associated with an error correction coding (ECC) failure to a first op-code or first procedure call,
a second condition associated with a reliability measurement to a second op-code or second procedure call, and
a third condition associated with wear leveling to a third op-code or third procedure call.

14. A data storage device comprising:
a non-volatile memory including a condition-to-identifier mapping that maps a detected condition to an instruction identifier; and
a controller coupled to the non-volatile memory, wherein the controller is configured to:
send an instruction to a host device to cause the host device to perform at least one specified computation at a processor of the host device, the instruction determined based on the instruction identifier,
receive a response from the host device, wherein the response:
includes output data and an operation identifier, and
is based on performance of the at least one specified computation; and
perform an operation based on the instruction identifier and based on a mapping of the operation identifier to the operation.

15. The data storage device of claim 14, wherein the controller:
includes an instruction identifier engine that is configured to select an instruction op-code or procedure call based on the condition-to-identifier mapping, the instruction including the instruction op-code or the procedure call, and
is further configured to process the response based on the output data and the mapping.

16. The data storage device of claim 15, wherein the instruction op-code or procedure call has a length of one byte.

17. The data storage device of claim 14, wherein the instruction includes data to be used by the host device during performance of the at least one specified computation.

18. The data storage device of claim 14, wherein:
the response includes output data associated with the instruction identifier, and
the controller is further configured to process the output data based on the instruction identifier and based on the operation identifier.

19. The data storage device of claim 14, wherein:
the non-volatile memory comprises a flash memory and further includes a driver, the driver defining multiple computations that are capable of being performed by the host device, and
the controller is further configured to provide the driver to the host device.

20. The data storage device of claim 14, wherein the operation identifier indicates one or more of:
a parameter to be set at the data storage device;
an operation to be performed by the data storage device; or
a manner in which the data storage device is to process the output data, the output data associated with the instruction identifier or the at least one specified computation.

21. The data storage device of claim 14, wherein the operation identifier indicates one or more specified operations, the one or more specified operations to be performed by the controller using one or more data structures that store the a condition-to-identifier mapping.

22. An apparatus comprising:
means for storing data, the means for storing data including a condition-to-identifier mapping that maps a detected condition to an instruction identifier; and
means for controlling the means for storing data, the means for controlling configured to:
send an instruction to means for processing to cause the means for processing to perform at least one specified computation, the instruction determined based on the instruction identifier;
receive a response from the means for processing, wherein the response:
includes output data and an operation identifier, and
is based on performance of the at least one specified computation; and
perform an operation based on the instruction identifier and based on a mapping of the operation identifier to the operation.

23. The apparatus of claim 22, wherein the means for controlling is further configured to:
select an instruction op-code or procedure call based on the condition-to-identifier mapping; and
process the response based on the output data and the mapping.

* * * * *